United States Patent [19]

Pettitt

[11] Patent Number: 5,201,862
[45] Date of Patent: Apr. 13, 1993

[54] LOW REFRIGERANT CHARGE PROTECTION METHOD

[75] Inventor: Edward D. Pettitt, Burt, N.Y.

[73] Assignee: General Motors Corporation, Detroit, Mich.

[21] Appl. No.: 309,570

[22] Filed: Feb. 13, 1989

[51] Int. Cl.$^5$ .......................................... G05D 23/32
[52] U.S. Cl. ........................................ 62/157; 62/227
[58] Field of Search ............... 62/157, 126, 228.3, 62/208, 227, 149

[56] References Cited

U.S. PATENT DOCUMENTS

| | | | |
|---|---|---|---|
| 4,395,886 | 8/1983 | Mayer | 62/227 X |
| 4,463,573 | 8/1984 | Zeno et al. | 62/157 |
| 4,463,576 | 8/1984 | Burnett et al. | 62/157 X |
| 4,796,436 | 1/1989 | Voorhis et al. | 62/149 X |

Primary Examiner—William E. Wayner
Attorney, Agent, or Firm—R. L. Phillips

[57] ABSTRACT

A microprocessor based control for an automotive air conditioner receives inputs from transducers which measure suction gas pressure and temperature and ambient air temperature and provides outputs for compressor clutch control and instrument panel lights. The control includes a table of warning temperatures and critical temperatures of suction gas for various ranges of ambient temperature. The control is programmed to carry out the process of comparing compressor on times to a threshold and shutting down the compressor when the on times are repeatedly less than the threshold, looking up table values for warning temperature and critical temperature for the current ambient temperature, comparing suction gas temperatures to the table values and shutting down the compressor when the temperature is repeatedly above the critical temperature and giving a warning when the temperature is repeatedly above the warning temperature.

5 Claims, 3 Drawing Sheets

| AMBIENT TEMPERATURE °F | THRESHOLD °F | |
|---|---|---|
| | WARNING | CRITICAL |
| AMB | T-EOTW | T-EOTC |
| 100+ | 80 | 95 |
| 90+ | 73 | 80 |
| 80+ | 63 | 74 |
| 70+ | 58 | 66 |
| 60+ | 50 | 55 |
| 50+ | 42 | 45 |
| 40+ | 38 | 44 |

LOW REFRIGERANT CHARGE PROTECTION METHOD

FIELD OF THE INVENTION

This invention relates to a control method for a refrigeration system and particularly to a method of preventing damage to an air conditioning compressor as a result of low refrigerant.

BACKGROUND OF THE INVENTION

Automotive air conditioning systems generally comprise a refrigerant compressor, a condenser for removing excess heat from high pressure refrigerant, an expansion orifice for rapidly changing the pressure and temperature of the refrigerant, an evaporator for heat transfer between the air conditioning system and the passenger compartment of the automobile, and an accumulator for separating the gaseous and liquid refrigerant at the outlet of the evaporator. A suction line returns the gaseous refrigerant from the accumulator to the compressor. A small amount of oil is suspended in the refrigerant for lubrication of the moving parts of the compressor. The refrigerant level or charge therefore determines the degree of compressor lubrication as well as the cooling performance of the system.

If a significant portion of the refrigerant escapes, compressor lubrication may be insufficient, and continued operation under such conditions could severely damage the compressor. Accordingly, it has been proposed in certain prior art systems to sense the level of refrigerant and to disable the compressor if the refrigerant level falls below a reference level. Such systems, however, are usually expensive to implement since they require a special transducer for sensing the refrigerant level.

Other proposals have recognized that the compressor operation changes when the refrigerant level falls to a low level and the operation parameters are measured to detect the low level event. U.S. Pat. No. 4,463,573 to Zeno et al teaches using a pressure switch in the accumulator of an air conditioner and measuring the frequency of switch operation, a frequency higher than normal reflecting low refrigerant level. At a given frequency a warning signal is given and the compressor is disabled.

U.S. Pat. No. 4,463,576 to Burnett et al provides another arrangement for sensing the effect of low refrigerant on compressor operation. There, the duration of compressor energization periods is detected as an indication of low refrigerant charge. When the charge is low the compressor on time is short. To guard against false signals, three or more consecutive short on times is regarded as a valid low charge indication. If a condition of low refrigerant charge is detected, the compressor is disabled and an instrument panel lamp is lit. The present invention incorporates the teachings of Burnett et al, U.S. Pat. No. 4,463,576, which is incorporated herein by reference, and seeks to improve on the method of operation by adding still another indicator of low refrigerant charge.

SUMMARY OF THE INVENTION

It is therefore an object of the invention to provide an improved method of sensing low refrigerant charge in an air conditioning system for protecting the compressor. It is a further object to provide a method of warning that the low charge condition is impending before it is necessary to disconnect the compressor.

The invention is carried out in an automotive air conditioning system of the cycling clutch orifice tube type using lubricant in the refrigerant for compressor lubrication and wherein low refrigerant results in short compressor on times and high suction gas temperature, the method of protecting against operation with inadequate refrigerant comprising the steps of: establishing a table of the maximum allowable suction gas temperature for various ambient air temperatures, measuring suction gas temperature and ambient air temperature, comparing the measured suction gas temperature with the corresponding table value, measuring compressor on time, comparing the compressor on time to a preset value, periodically repeating the measuring and comparing steps, and disabling the compressor when the on time is repeatedly less than the preset value or when the measured suction gas temperature is repeatedly greater than the table value.

The invention is further carried out by the above method with the additional steps of establishing warning suction gas temperatures, comparing the measured suction gas temperatures with the warning temperatures and giving a warning indication when the measured temperature repeatedly is found to be above the warning temperature.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figures 1, 2:
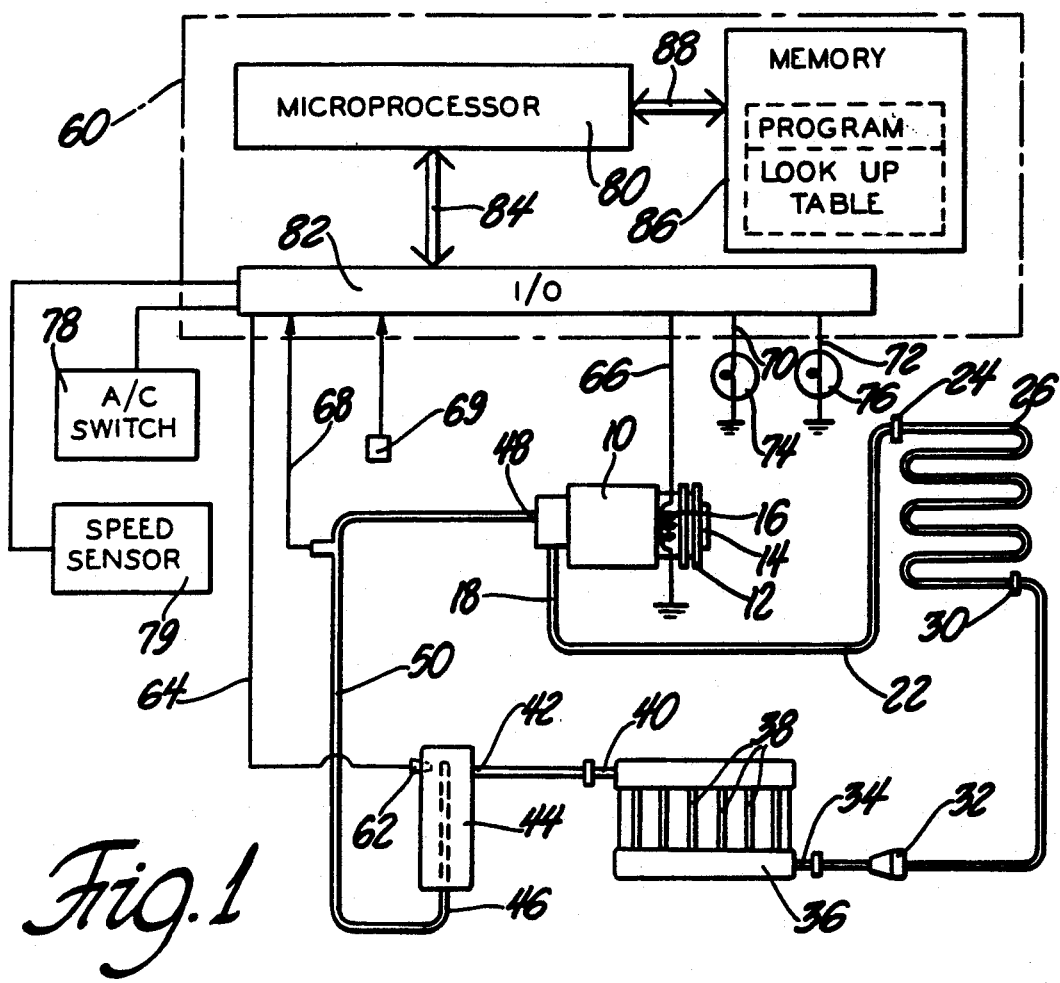
FIG. 1 is a schematic illustration showing an automotive air conditioning system and the control unit therefor.
FIG. 2 is a table of temperature threshold values used in the control of FIG. 1, and FIGS. 3 and 4 together are a flow chart illustrating the control sequence according to the invention for the control unit of FIG. 1.

Referring to FIG. 1, reference numeral 10 generally designates an air conditioning refrigerant compressor. Connected to the compressor 10 is a pulley assembly 12 which is rotatably driven by the automotive engine with a V-belt (not shown). Compressor 10 further includes an electromagnetic clutch 14 and a clutch coil 16 selectively energizable to connect pulley assembly 12 in driving engagement with the compressor drive shaft. The outlet 18 of compressor 10 is attached to flexible hose 22 which is connected to the inlet 24 of condenser 26. Condenser 26 is typically located in a manner to be exposed to a flow of air for cooling and liquifying warm refrigerant discharged from compressor 10. Outlet 30 of condenser 26 is connected to an orifice tube-type expander 32 which rapidly decreases the pressure of the liquid refrigerant discharged from condenser 26 to effect rapid cooling of the refrigerant. A more detailed description of such an orifice tube expander is given in the U.S. Pat. No. 3,815,379 to Scherer. The outlet of orifice expander 32 is connected to the inlet 34 of evaporator 36. Liquid refrigerant in the evaporator is vaporized or "boiled" in vertical passages or tubes 38 each having fluid conveying portions and exterior finned surfaces formed thereon. The evaporator 36 has an outlet 40 which is connected to an inlet 42 of accumulator 44. The accumulator 44 separates the liquid and gaseous refrigerant, and discharges the gaseous refrigerant through an outlet 46 to inlet 48 of compressor 10 via suction line 50. A more detailed description of accumulator 44 is given in the U.S. Pat. No. 4,111,005 to Livesey.

Pressure-to-voltage transducer 62 is placed in accumulator 44 so as to be responsive to the refrigerant vapor pressure therein. The electrical signal output of transducer 62 is applied as an input to a control unit 60 via line 64. In response to pressure variations in accumulator 44, control unit 60 controls the energization of clutch coil 16 via line 66. A temperature-to-voltage transducer 68 is also placed in the accumulator 44 or elsewhere in the suction line 50 for response to the temperature of the suction gas or refrigerant vapor. A second temperature-to-air transducer 69 measures ambient air temperature. Each transducer 68 and 69 supplies a temperature dependant signal to the control unit 60. As will be described, the control is effective to sense when refrigerant charge is so low as to require the cessation of compressor operation and also to sense when the charge is just sufficiently low to justify a warning signal to the operator. The control is thus connected by lines 70 and 72, respectively, to instrument panel light 74 which indicates that the compressor has been disabled and light 76 which provides a warning of moderately low refrigerant charge. The latter warning enables the operator to service the system at a convenient time before a critical stage is reached so that it will not be necessary for the control to interrupt the air conditioner operation. Additional input devices to the control are an air conditioner on/off switch 78 and a vehicle speed sensor 79.

The control unit 60 comprises a microprocessor 80 with conventional accessory circuitry including an input/output (I/O) circuit 82 coupled by a bus 84 to the microprocessor 80, and a memory 86 coupled by a bus 88 to the microprocessor. The I/O circuit receives signals from the transducers 62, 68 and 69, the A/C switch 78 and the speed sensor 79 and sends equivalent data to the microprocessor as well as receiving signals from the microprocessor and furnishing output signals to the clutch coil 16 and lights 74 and 76. The memory 86 includes ROM holding a program for controlling the operation and a look-up table and RAM for calculations, counters and storing flags. While the control may be dedicated to the refrigeration system, it may instead share functions with some other vehicle system.

The control unit 60 is programmed to disable the compressor if a series of short on times indicates a critical refrigerant charge, to give a warning only if the suction gas temperature repeatedly exceeds a first threshold, and to disable the compressor if the suction gas temperature repeatedly exceeds a second threshold which is higher than the first threshold. The threshold temperatures are dependent on the ambient air temperature since for a given refrigerant charge level the suction gas will have a higher temperature when the ambient air is warmer. Thus, to correlate critical refrigerant level to gas temperature the threshold is varied with ambient air temperature as shown in the table of FIG. 2. Similarly the "warning level" temperature threshold is varied as shown in the table.

Figure 3:
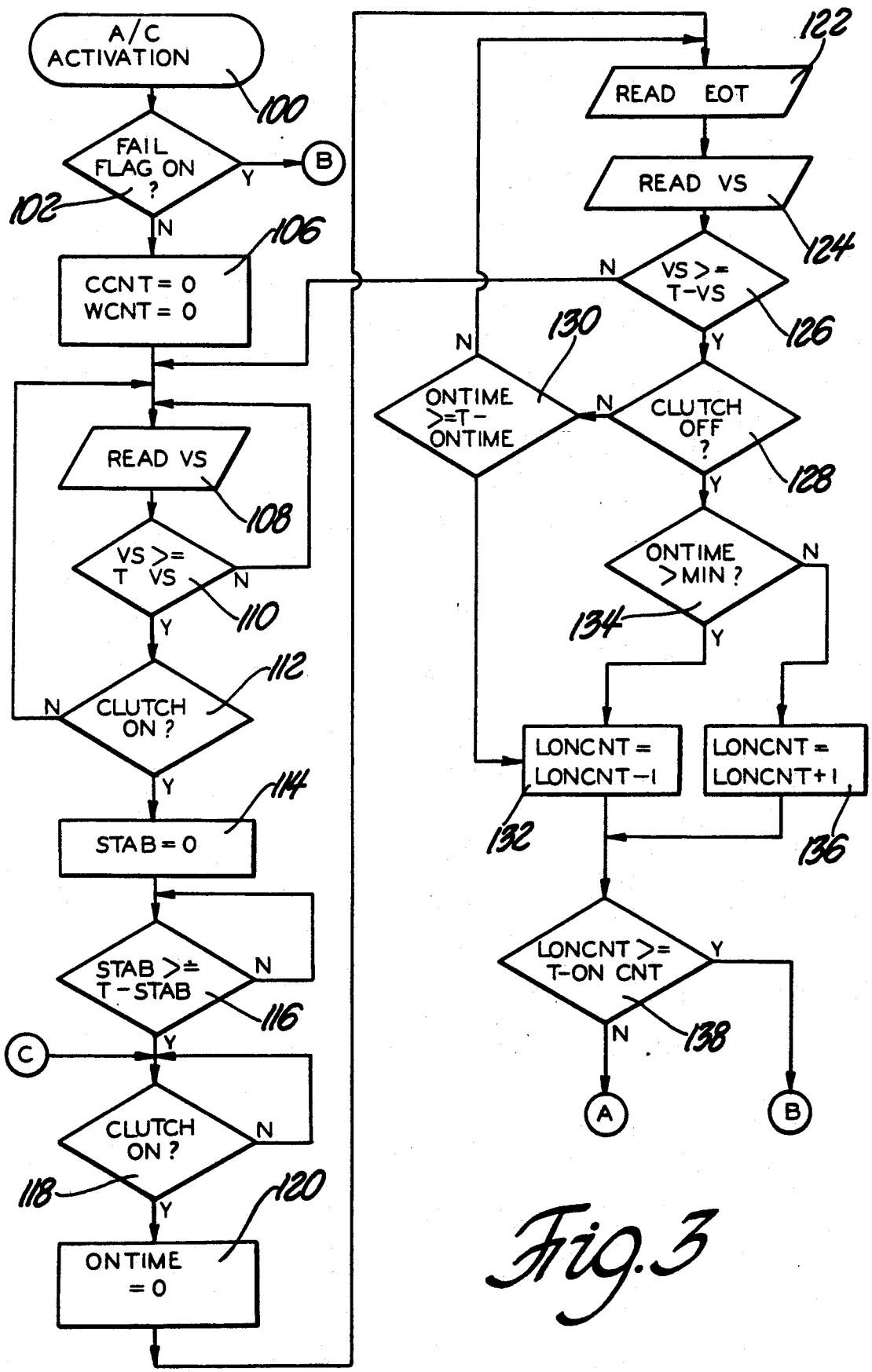
Figure 4:
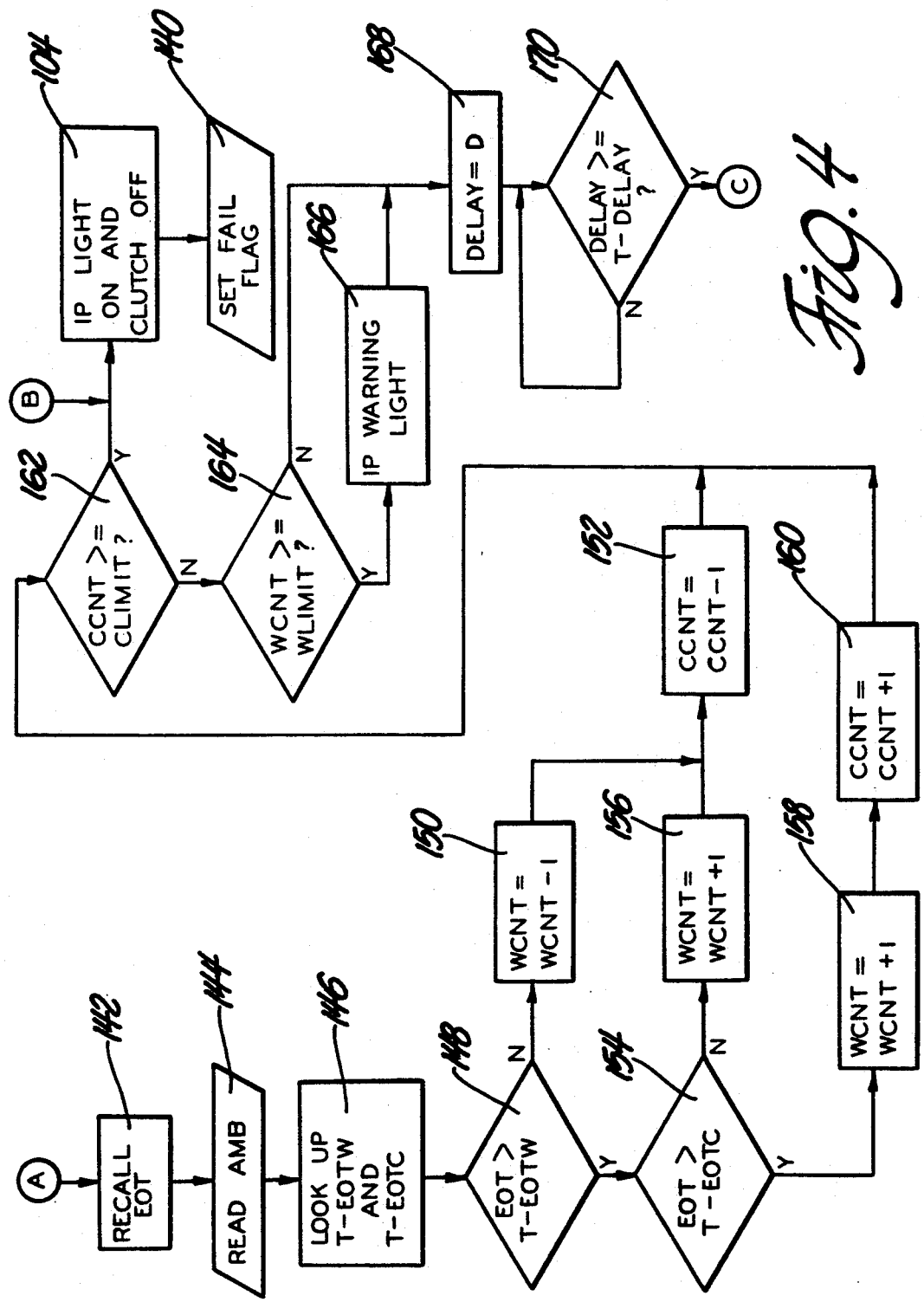

Referring to the flow chart in FIGS. 3 and 4, it should be noted that the flow paths terminating at nodes A and B in FIG. 3 continue at A and B in FIG. 4 and likewise path ending at node C in FIG. 4 loops back to point C of FIG. 3. In the ensuing description the reference numerals in angle brackets refer to the operation indicated in the corresponding numbered box in the flow chart.

Upon air conditioner activation <100> effected by closing the A/C switch 78, a fail flag is checked <102> and if it is on, indicating that the system previously had determined that the refrigerant charge was critical, the light 70 is turned on and the clutch is turned off <104>. If the flag is off, two registers CCNT (critical count) and WCNT (warning count) are set to zero <106>. Then vehicle speed (VS) is read <108> and it is compared <110> to a preset threshold or table value of vehicle speed (TVS). A typical value of speed threshold is 20 mph. If the speed is low the speed is repeatedly read until the threshold is met. Then the program checks whether the compressor clutch is on <112> and if not it loops back to the vehicle speed check. When both the speed and clutch conditions are satisfied, the STAB clock is set to zero <114> and STAB time is checked against a threshold T-STAB <116> which may insure that the system has run long enough after the vehicle has substantial speed to reach stable operation.

When the system stabilization has been assured, the clutch operation is again tested <118>. When the clutch turns on the clutch ONTIME clock is set to zero <120> and timing begins. Then the suction line gas temperature or evaporator out temperature EOT is measured <122> via transducer 68 and stored in memory. The vehicle speed VS is again measured <124> and compared to the table value <126> to be sure that the vehicle is still above 20 mph. If not, the program returns to block 108. If the speed is high, the clutch operation is tested <128>. If the clutch has not turned off the ONTIME is compared to a table value T-ONTIME <130> and if it is lower than the table value (say, 4 sec) the programs loops back to block 122 until the clutch turns off or the ONTIME exceeds the table value. If ONTIME does exceed T-ONTIME a low on counter LONCNT is decremented <132> but if the clutch turns off <128> and ONTIME is less than a minimum e.g. 1.5 sec, <134>, the LONCNT is incremented <136>. Conversely, if the clutch turns off and the ONTIME is greater than the minimum, the LONCNT is decremented <132>. The value of LONCNT is compared to a table value (10 counts) T-ONCNT <138> and if that is exceeded (path B) the instrument panel light is turned on and the clutch is turned off <104> to disable the system and the fail flag is set <140>. In this manner the control method of the Burnett patent is carried out. That is, if the compressor repeatedly runs for short cycles the system is disabled after a preset number of short cycles. Any long cycles dispersed in the short cycles serve to reduce the count since they indicate the charge is not critical.

If the T-ONCNT has not been reached <138> (path A) the value of EOT is recalled from memory <142> and the ambient air temperature AMB is read <144> via transducer 69. Then the look up table in memory is consulted <146> to determine table values T-EOTW for a warning threshold temperature of suction gas and T-EOTC for a critical threshold temperature of suction gas. The look up table as shown in FIG. 2 provides a warning temperature and a critical temperature for each decade of ambient temperatures. For example, the ambient temperature 80+ applies to all measured temperatures from 80 degrees F. to just below 90 degrees. For that range, T-EOTW is 63 degrees and T-EOTC is 74. If EOT is not greater than T-EOTW <148> a warning counter WCNT is decremented <150> and a critical counter CCNT is decremented <152>. If EOT is above the warning threshold <148> and not above the critical threshold <154>, WCNT is incremented <156> and CCNT is decremented <152>. If EOT is above the critical threshold T-EOTC <154> WCNT is incremented <158> and CCNT is also incremented <160>. Then CCNT is compared <162> to a preset limit value CLIMIT (10 counts) and if the limit has been reached the system is disabled <104> and the fail flag set <140>. If CCNT is below the limit, WCNT is compared <164> to its limit (10 counts) and if the limit has been reached the instrument panel warning light 76 is lit. If the limit has not been reached or if the warning lamp is lit, a delay counter is set at zero <168> and a delay comparator loops <170> until a value T-DELAY (6 sec) is reached <170> and then the program returns to block 118 to repeat. Thus the compressor on times and the suction gas temperature are monitored about every 6 to 10 seconds, depending on the length of compressor on time as sensed in blocks 130 and 134.

The specific parameters suggested in the FIG. 2 table or in the text above are those successfully used in a particular automotive air conditioner system, but obviously different values may be chosen for another system. In any event, the control is effective to disable the compressor as a result of repeated short compressor on times or by repeated critical suction gas temperature readings. It has been found that the compressor on time control is most effective at low ambient temperatures while the suction gas temperature is a better control at higher temperatures. In addition the control is able to give a warning when the warning temperatures is repeatedly attained. Since the warning temperature is lower than the critical charge temperature the warning gives the operator an opportunity to have the system recharged before a shut down occurs.

The embodiments of the invention in which an exclusive property or privilege is claimed are defined as follows:

1. In an automotive air conditioning system of the cycling clutch orifice tube type using lubricant in the refrigerant for compressor lubrication and wherein low refrigerant results in short compressor on times and high suction gas temperature, the method of protecting against operation with inadequate refrigerant comprising the steps of:
   establishing a table of the maximum allowable suction gas temperature for various ambient air temperatures,
   measuring suction gas temperature and ambient air temperature,
   comparing the measured suction gas temperature with the corresponding table value,
   measuring compressor on time,
   comparing the compressor on time to a preset value,
   periodically repeating the measuring and comparing steps, and
   disabling the compressor when the on time is repeatedly less than the preset value or when the measured suction gas temperature is repeatedly greater than the table value.

2. In an automotive air conditioning system of the cycling clutch orifice tube type using lubricant in the refrigerant for compressor lubrication and wherein low refrigerant results in short compressor on times and high suction gas temperature, the method of protecting against operation with inadequate refrigerant comprising the steps of:
   establishing a table of the maximum allowable suction gas temperature for various ambient air temperatures,
   measuring suction gas temperature and ambient air temperature,
   comparing the measured suction gas temperature with the table value corresponding to the ambient temperature,
   incrementing a temperature count when the measured temperature is greater than the table value and decrementing the temperature count when the measured temperature is less than the table value,
   measuring compressor on time,
   comparing the compressor on time to a preset value,
   incrementing an on time count when the measured on time is less than the preset value and decrementing the on time count when the measured on time is greater than the preset value,
   periodically repeating the measuring and comparing steps, and
   disabling the compressor when either one of the on time count and the temperature count reaches a respective limit value.

3. The invention as defined in claim 2 including a method of warning of a low refrigerant condition which is less severe than the condition resulting in disabling the compressor including the steps of:
   establishing a table of suction gas warning temperatures for various ambient air temperatures,
   comparing the measured suction gas temperature with the warning temperature table value corresponding to the ambient temperature,
   incrementing a warning count when the measured temperature is greater than the warning temperature table value and decrementing the warning count when the measured temperature is less than the warning temperature table value, and
   activating a warning when the warning count reaches a preset value.

4. The invention as defined in claim 1 including the step of enabling the method when the air conditioner is turned on, the vehicle speed has reached a minimum value, and the compressor has been functioning long enough for stable system operation.

5. The invention as defined in claim 3 including the step of enabling the method when the air conditioner is turned on, the vehicle speed has reached a minimum value, and the compressor has been functioning long enough for stable system operation.

* * * * *